UNITED STATES PATENT OFFICE.

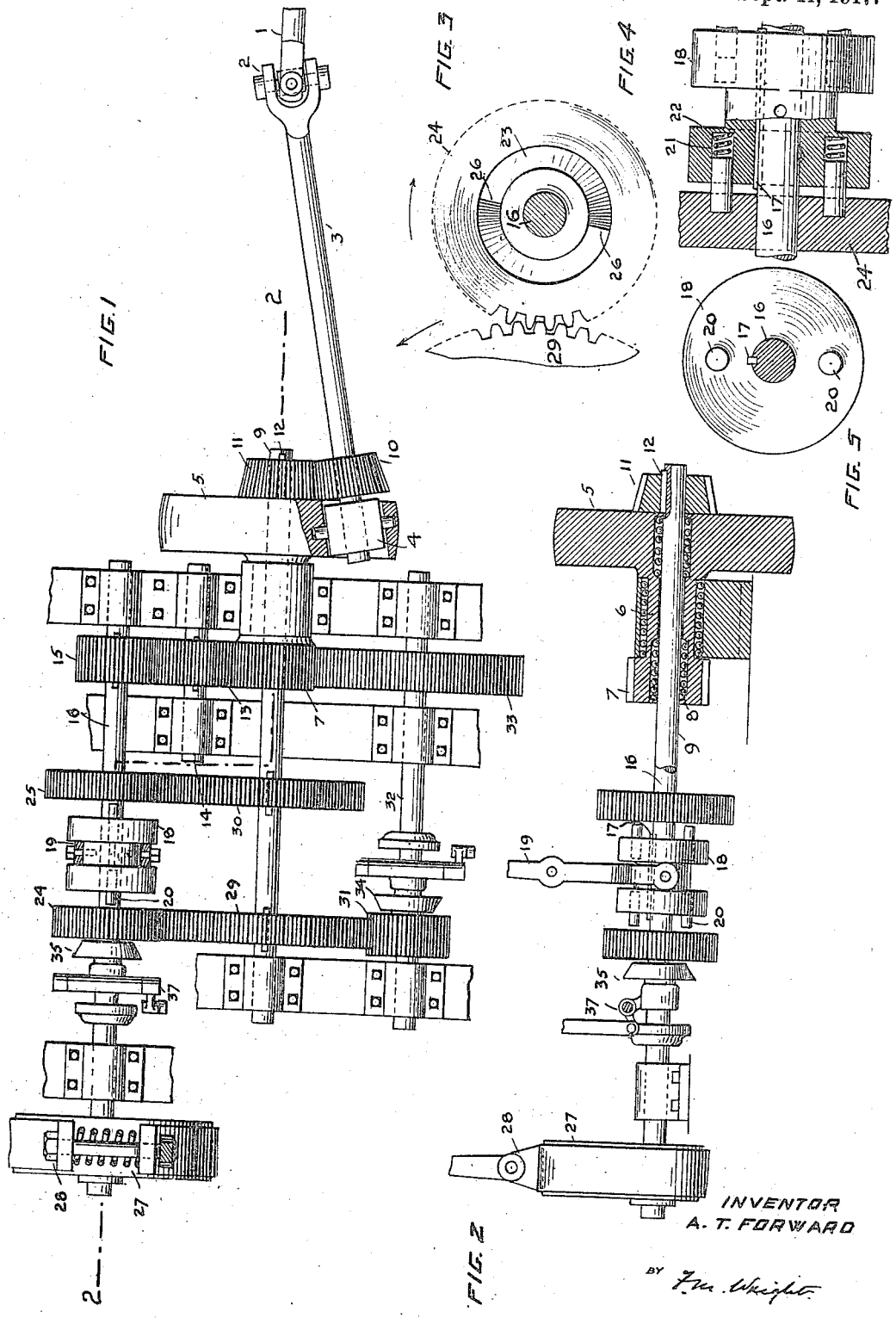

ALFRED T. FORWARD, OF MANTON, CALIFORNIA.

TRANSMISSION-GEAR.

1,239,781.   Specification of Letters Patent.   Patented Sept. 11, 1917.

Application filed November 7, 1916.   Serial No. 129,951.

*To all whom it may concern:*

Be it known that I, ALFRED T. FORWARD, a citizen of the United States, residing at Manton, in the county of Tehama and State of California, have invented new and useful Improvements in Transmission-Gears, of which the following is a specification.

The present invention relates to improvements in transmission mechanism for transmitting rotary motion from a driving shaft to a driven shaft, such as are used for transmitting power from the engine of a motor car to the driving wheels thereof.

One object of the invention is to provide such mechanism, the gears of which will always be in mesh and the connections between them can be changed while the engine is at full speed, thereby avoiding the trouble and annoyance of meshing the teeth of the gear wheels together, and the danger of stripping the gears by reason of failure to throw out the clutch when interchanging the gears.

A further object is to provide such mechanism, which, when the engine has been driving a motor car or other moving object at high speed, and it is required to reduce the speed of the driven object, the means for transmitting power to said driven object at lower speed will automatically engage when the speed of the driven object has fallen to the desired lower speed, thereby preventing the engagement of the gears with a sudden jar caused by the differences in the speed of the several coengaging parts.

A further object is to provide such transmission mechanism which will obviate the necessity of using the main clutch which is commonly used on motor cars.

In the accompanying drawing, Figure 1 is a plan view, partly broken away, of my improved transmission; Fig. 2 is a broken side view thereof; Fig. 3 is an enlarged side view of a gear wheel; Fig. 4 is a broken side view of a clutch member showing a gear wheel in section; Fig. 5 is an end view of said clutch member.

Referring to the drawing, 1 indicates an engine shaft, the rear end of which is connected by a universal joint 2 to the front end of an intermediate shaft 3, which extends rearwardly and at a slight angle with the engine shaft, its rear end being slidably supported in a bearing 4, movably carried by a wheel or disk 5, integral with a hub 6 and a gear wheel 7, and rotatable on ball bearings 8 around a driven shaft 9, the rear end of which is operatively connected to the driving wheels of a motor car, or to some other object to be rotated. Said intermediate shaft has fixedly secured thereto a slightly beveled gear wheel 10, which meshes with a bevel gear wheel 11 keyed, as shown at 12, to the shaft 9. Said gear wheel 7 meshes with a gear wheel 13 on an intermediate shaft 14, which gear wheel 13 meshes with a gear wheel 15 on a countershaft 16 having slidably keyed thereon, as shown at 17, a clutch member 18 adapted to be shifted by a lever 19, and carrying in each face thereof two pins 20, received in diametrically opposite sockets 21 in said face, and pressed outward by compressed coiled springs 22 in said sockets. The outer ends of said pins travel in circular grooves 23 in the inner faces of low and high gear wheels 24, 25, said grooves each gradually increasing in depth from two diametrically opposite shoulders 26 through a semi-circle. Upon said countershaft 16 is secured a brake drum 27, on which is a brake band 28. Said gear wheels 24, 25 mesh respectively with gear wheels 29, 30 keyed to the driven shaft 9.

The larger gear wheel 29 meshes with a gear wheel 31 loose on a reversing shaft 32, upon which is keyed a gear wheel 33 meshing with the gear wheel 7. Said gear wheel 31 can be caused to rotate with said shaft 32 by means of a friction clutch 34 slidably keyed to the shaft 32 and adapted to be moved into an annular cavity in the gear wheel 31.

The following is the operation of the transmission as applied to a motor car: When the engine is in motion and the car is at rest, the brake band 28 is loose around the brake drum 27, and the clutch member 18 is intermediate between the two gear wheels 24 and 25. The shaft 9 does not then rotate, but the rotary motion of the intermediate shaft 3 causes the bevel gear 10 to revolve around the bevel gear 11 without imparting rotary motion to said shaft 9, but it rotates the wheel or disk 5, and therefore rotates also the countershaft 16 which is not held by the brake band. To start the car, the clutch member 18 is moved into engagement with the low gear wheel 24, which causes said low gear wheel to rotate with the countershaft, the pins 20 in the clutch member being projected by the springs and finding their way to the lowest part of the groove 23 and abutting against the shoulders 26, and thereby rotates the shaft 9 at low speed. The bevel gear 10 is still rotating around the bevel gear 11, but at a less speed of rotary motion about the axis of the shaft 9, because the bevel gear 11 is now rotating in the opposite direction to the bevel gear 10.

The car may also be started from rest, especially in locations where considerable power is required to start it, by employing a friction clutch 35, slidably mounted upon the shaft 16, and which may be caused by suitable leverage 37 to engage the low gear wheel 24.

To shift now to high speed, the countershaft 16 is arrested, by tightening the brake band 28 around the brake drum 27, and thereby the wheel 5 is also locked, rendering stationary also the intermediate shaft 3, so that the bevel gear 11 rotates at the same speed as the bevel gear 10, if the bevel gears 10 and 11 are equal, as here shown, although this is not necessarily the case, and therefore driving the shaft 9 at the highest speed attainable.

To change the speed from high to intermediate or low, as, for instance, the former, the clutch member is moved into engagement with the gear wheel 25, the pins in the face of the clutch member opposite to said gear wheel being alternately driven into their sockets by the bottoms of the groove in the gear wheel 25, and being projected outward from said sockets by the compressed springs 22, and the brake is then released, permitting the shaft 16 to rotate. As the speed of the shaft 9 decreases and that of the shaft 16 gradually increases, the speed of the latter shaft eventually becomes greater than that of the former. The pins in the clutch member then catch up with, and impinge against, the shoulders in the grooves in the gear wheel 25 and rotate the shaft 16, so that the shaft 9 is now driven partly by the direct engagement of the bevel wheels 10 and 11, and also partly by the rotation of the gear wheel 30 meshing with the gear wheel 25, rotated by the shaft 16 driven by the gear wheel 15, intermediate gear wheel 13 and gear wheel 7 which is secured to the wheel 5 rotated by the intermediate shaft 3.

A similar result occurs when the clutch member is moved into engagement with the low gear wheel 24, the speed of the shaft 9 relative to the engine shaft being still further reduced.

When it is desired to reverse the motion of the shaft 9, the brake band 28 being still loose, and the clutch member 18 being out of engagement with both the gear wheels 24 and 25, the friction clutch 34 is thrown into engagement with the gear wheel 31, and then motion is imparted in the reverse direction to the shaft 9, by means of the rotary motion of the wheel 7 about the shaft 9, thereby also rotating the gear wheel 33 meshing therewith, and also the shaft 32 upon which said gear wheel is keyed, thereby also rotating the friction clutch 34 and thereby rotating the gear wheel 31 meshing with said gear wheel 29, and so rotating the shaft 9 in the opposite direction.

I have for the sake of brevity and simplicity of description and illustration herein shown only two of the lower speed gear wheels and coöperative mechanisms therefor, but it is obvious that such gear wheels and mechanisms can be provided for any number of such different lower speeds, the lowermost speed being used especially for starting the car from a position of rest.

I claim:—

1. In a device of the character described, the combination of a driving shaft, an intermediate shaft, a flexible joint connecting one end of the intermediate shaft with the driving shaft, a driven shaft in line with the driving shaft and having a bevel gear fixed thereon, a bearing revoluble around said driven shaft, the other end of said intermediate shaft rotating in said bearing, a bevel wheel on said intermediate shaft meshing with the first-named bevel wheel, a countershaft parallel with said driven shaft, a brake therefor, means whereby said countershaft rotates in the same direction as said bearing, a gear wheel loose on said countershaft, a clutch member rotatable with, but slidable on, said countershaft, and adapted to engage said loose gear wheel, and a gear wheel fixed on said driven shaft, and with which said loose gear wheel meshes.

2. In a device of the character described, the combination of a driving shaft, an intermediate shaft, a flexible joint connecting one end of the intermediate shaft with the driving shaft, a driven shaft in line with the driving shaft and having a bevel gear fixed thereon, a bearing revoluble around said driven shaft, the other end of said intermediate shaft rotating in said bearing, a bevel wheel on said intermediate shaft meshing with the first-named bevel wheel, a countershaft parallel with said driven shaft, a brake therefor, means whereby said countershaft rotates in the same direction as said bearing, gear wheels loose on said countershaft, a clutch member rotatable with, but slidable on, said countershaft, and adapted to engage either of said loose gear wheels, and gear wheels fixed on said driven shaft, and with which said loose gear wheels respectively mesh.

3. In a device of the character described, the combination of a driving shaft, an intermediate shaft, a flexible joint connecting one end of the intermediate shaft with the driving shaft, a driven shaft in line with the driving shaft and having a bevel gear fixed thereon, a bearing revoluble around said driven shaft, the other end of said intermediate shaft rotating in said bearing, a bevel wheel on said intermediate shaft meshing with the first-named bevel wheel, a countershaft parallel with said driven shaft, a brake therefor, means whereby said countershaft rotates in the same direction as said bearing, a gear wheel loose on said countershaft, a clutch member rotatable with, but slidable on, said countershaft, and adapted to engage said loose gear wheel automatically when the speed of the loose gear wheel diminishes to that of the clutch member, and a gear wheel fixed on said driven shaft, and with which said loose gear wheel meshes.

4. In a device of the character described, the combination of a driving shaft, an intermediate shaft, a flexible joint connecting one end of the intermediate shaft with the driving shaft, a driven shaft in line with the driving shaft and having a bevel gear fixed thereon, a bearing revoluble around said driven shaft, the other end of said intermediate shaft rotating in said bearing, a bevel wheel on said intermediate shaft meshing with the first-named bevel wheel, a reversing shaft rotated in the opposite direction by the revolution of said bearing, a friction clutch thereon, a gear wheel with which said friction clutch can engage, and a gear wheel meshing therewith on the driven shaft.

5. In a device of the character described, the combination of a driving shaft, an intermediate shaft, a flexible joint connecting one end of the intermediate shaft with the driving shaft, a driven shaft in line with the driving shaft and having a bevel gear fixed thereon, a bearing revoluble around said driven shaft, the other end of said intermediate shaft rotating in said bearing, a bevel wheel on said intermediate shaft meshing with the first-named bevel wheel, a countershaft parallel with said driven shaft, a brake therefor, means whereby said countershaft rotates in the same direction as said bearing, a gear wheel loose on said countershaft, a clutch member rotatable with, but slidable on, said countershaft, and adapted to engage said loose gear wheel, a gear wheel fixed on said driven shaft, and with which said loose gear wheel meshes, and a friction clutch on the countershaft adapted to engage the said loose gear wheel.

6. In a device of the character described, the combination of a driving shaft, an intermediate shaft, a flexible joint connecting one end of the intermediate shaft with the driving shaft, a driven shaft in line with the driving shaft and having a conical transmission device thereon, a bearing revoluble around said driven shaft, the other end of said intermediate shaft rotating in said bearing, a conical transmission device on said intermediate shaft co-engaging with the first-named device, a countershaft, a brake therefor, means for rotating said countershaft from the revolution of said bearing, a gear wheel loose on said countershaft, means whereby said gear wheel can be caused to rotate with said countershaft, and a gear wheel fixed on said driven shaft, and with which said loose gear wheel meshes.

ALFRED T. FORWARD.

Copies of this patent may be obtained for five cents each, by addressing the "Commissioner of Patents, Washington, D. C."